United States Patent [19]
Franz et al.

[11] 4,079,258
[45] Mar. 14, 1978

[54] LUMINESCENT SCREEN EXCITABLE WITH ENERGY-RICH RADIATION

[75] Inventors: Karl Franz; Margot Stachowiak, both of Erlangen, Germany

[73] Assignee: Siemens Aktiengesellschaft, Berlin & Munich, Germany

[21] Appl. No.: 655,260

[22] Filed: Feb. 4, 1976

[30] Foreign Application Priority Data

Feb. 13, 1975 Germany .................... 2505991

[51] Int. Cl.² ................. H01J 31/50; G01J 1/58
[52] U.S. Cl. ................... 250/483; 250/213 VT
[58] Field of Search .............. 250/483, 213 VT

[56] References Cited

U.S. PATENT DOCUMENTS

| 2,851,612 | 9/1958 | Davey | 250/483 |
| 3,147,226 | 9/1964 | Jonck | 250/483 X |
| 3,795,531 | 3/1974 | Spicer | 250/213 VT X |

FOREIGN PATENT DOCUMENTS

| 503,260 | 5/1954 | Canada | 250/483 |
| 538,178 | 7/1941 | United Kingdom | 250/483 |

*Primary Examiner*—Archie R. Borchelt
*Attorney, Agent, or Firm*—Hill, Gross, Simpson, Van Santen, Steadman, Chiara & Simpson

[57] ABSTRACT

A luminescent screen which is applicable to X-ray diagnosis, and also with particular advantage to the soft-radiation technology. For the producing of this fluorescent material, a corresponding quantity of rubidium bromide and thallium halogenide may be mixed under the addition of water, and thereafter dried through the introduction of heat.

6 Claims, 4 Drawing Figures

LUMINESCENT SCREEN EXCITABLE WITH ENERGY-RICH RADIATION

FIELD OF THE INVENTION

The present invention relates to a luminescent or fluorescent screen which is excitable by means of energy-rich radiation containing activated alkali halogenide as the luminescent material. Screens of this type are utilized, for instance, in the X-ray and gamma ray diagnosis so as to be able to obtain visible images from the invisile radiation. These images can then be evaluated through observation and/or conducted onto an exposure element, such as a photographic exposure film, a photocathode or a television receiver target and so forth, on which they will exert a good effect. That the yield, notwithstanding the high-loss conversion step, is better than the direct influence of the X-rays on film and targets and so forth, is as known based on the improved absorption of the light in comparison with the X-rays and other radiation.

DISCUSSION OF THE PRIOR ART

Known X-ray screens with fluorescent halogenides, in particular activated alkali halogenides, in which the activator is thallium, should produce the most grainless luminescent screens and, as a consequence, sharp images. Heretofore, there have been primarily employed potassium or cesium haloginide salts, and in particular iodide, as the basic substance of the luminescent or fluorescent material. Indicated hereby as also being applicable is rubidium iodide. However, all of these luminescent materials, and the therewith produced luminescent screens, were provided for a radiation, which is generally common in the X-ray diagnosis, having an energy level of 40 keV to 60 keV. These luminescent materials, such as sodium-activated cesium iodide (CSI:Na), which also is frequently employed in the image intensifiers, and has only been infrequently used in the soft-radiation-diagnosis, which is effectuated in medicine and in materials testing with X-rays of 10 keV to 30 keV since, due to the position of the K-edge, because such materials have unfavorable absorption ratios within this energy range.

SUMMARY OF THE INVENTION

Accordingly, it is an object of the present invention to provide a luminescent screen which is applicable to X-ray diagnosis, and which is particularly useful in soft-radiation technology.

In order to carry out the foregoing object of the invention, an X-ray or other energy-rich radiation converter screen is produced so as to contain activated rubidium bromide (RbBr:Act) wherein Act is an activator as the luminescent or fluorescent material.

Investigations which have lead to the invention have indicated that for X-rays with an energy level in the range of 10 keV to 30 keV, fluorescent pigments having a rubidium bromide-operative grid exhibit particularly good absorption. Such a fluorescent material may contain thallium halogenide as the activator (Act), so that it conforms to the general formula RbBr:Tl$_y$X, wherein y is a numeral in the range of 0.1 to 2 percent by weight, preferably 0.1 to 1 percent by weight, based on the weight of the fluorescent material, and X is at least one halogenide selected from the consisting group of bromide, chloride or iodide; preferably bromide.

For the producing of this fluorescent material, a select quantity of rubidium bromide and thallium halogenide may be mixed in water, and thereafter dried by applying heat to the resultant mixture. At the end of this step, wherein water serves primarily as an auxiliary medium for improved mixing of the aforesaid halogen salts there are obtained crystals which exhibit fluorescence upon impingement thereof with soft X-rays, meaning those which are generated with voltages of 5 kV to 40 kV. Alternatively, this fluorescent material may also be obtained through smelting of rubidium bromide (RbBr) in admixture with a required stoichiometric quantity of thallium halogenide (for example, TlBr). The smelting is carried out in a closed vessel, so that the thallium salts whose vapor pressure, as known, is quite high, will not escape in an uncontrolled manner. Suitably, prior to smelting, the reaction mixture has added thereto, in a manner known in the production of fluorescent materials, an amount to three-time quantity of ammonium bromide which is about equal to 3 times larger than the amount of the reaction mixture within the closed vessel so tht no impoverishment of bromide within the vessel occurs, inasmuch as the ammonium bromide can easily escape due to its low vapor pressure.

A fluorescent material produced in accordance with one of the above methods luminesces blue to violet when it is subjected to X-rays having an energy level of from 20 to 30 keV. The absorptive ability of the fluorescent material, for X-ray quantities of this energy level is at least twice as large as that of activated cesium iodide employed in the usual image intensifiers. Moreover, the fluorescent material of the invention can follow rapid changes in the radiation intensity, meaning at a decay time I/10, or the time within which the light intensity drops to 1/10, is $2 \times 10^{-7}$ to $5 \times 10^{-7}$ seconds for luminescent screens containing the fluorescent material of the invention. For cesium iodide this light intensity decay period is in the magnitude of about 1 to $2 \times 10^{-6}$ seconds. The light yield at energy levels >30 keV, with reference to the same layer thickness, consists at least 30 to 40% light yield from of layers which are coated with cesium iodide, activated with sodium. However, the effectiveness of rubidium bromide activated with thallium, produces improved results at X-ray energy levels of 10 keV to 30 keV, since the absorptive ability is appreciably more favorable within the energy range of 20 to 30 keV.

The emission obtained from luminescent screens produced with the fluorescent material of the invention lies within the range of the optimum sensitivity of the photocathodes commonly utilized in X-ray image intensifiers. Such photocathodes are essentially comprised of cesium and antimony.

The activated rubidium bromide fluorescent material which is to be employed pursuant to the invention is also producible in the form of fluorescent layers. In this embodiment, the rubidium bromide fluorescent pigment is separated off onto a carrier which is transmissive to X-rays in the quantum energy range of 10 keV to 30 keV. Suitable materials from which the carrier can be produced are carbon, aluminum, titanium, or plastic materials, such as polyimide, polyarylsulfone, or Lindemann glass. The shape of the carrier may be correlated with the requirements of the electron optic system utilized and may exhibit the approximate shape of a spherical indentation or recess. The surfaces of the carrier may be roughened prior to the application of the luminescent layer for increasing the adherence of the latter and for achieving a good picture quality.

The production of the luminescent layer may generally be so effectuated that, on a suitably pretreated carrier, there is initially vapor-deposited rubidium bromide in a high-vacuum until a desired layer thickness is achieveed. During this process, it is suitable, even though not absolutely necessary, that the carrier is maintained at a temperature of 300° C to 400° C; since such heating enhances the crystal buildup. The evacuation of the vaporization or coating chamber is carried out to at least a residual pressure of less than $10^{-2}$ torr. The layer of rubidium bromide can be activated by placing an amount of rubidium bromide into a vacuum-sealable vessel containing an amount of bromine and thallium bromide. These materials may be located generally on the floor of the vessel. The amount of the respective materials is not critical to the process, inasmuch as for the desired quality only the finally built-in component is decisive. After the closing of the vessel, the temperature is raised to 300° to 500° C. An optimum activation is then achieved in about 2 to 20 hours, in accordance with the structure and thickness of the layer. Subsequently there is produced on the fluorescent material layer, according to known methods, a thin layer, such as aluminum, which improves the electrical conductivity of the surface. This layer additionally prevents any ion diffusion between the photocathode and the fluorescent material. The luminescent screen may then be further processed in the usual manner wherein, for example the screen is built into a high vacuum receptacle, and a photocathode is provided within the vacuum receptacle or housing through the vapor-deposition of antimony and cesium.

In another process, a carrier, positioned in a high vacuum environment, is first coated with the activating medium, such as thallium bromide. The coating is interrupted when the quantity of the activator reaches two to three times that, which is required for activation of the provided quantity of rubidium bromide. In this process, due to the high vapor pressure of materials such as thallium bromide, it is advantageous to cool the carrier as extensively as possible. Thereafter, rubidium bromide is vapor coated as in the previously described process. In this process, it is advantageous to apply only about a quarter of the total amount of rubidium bromide required, onto the cooled carrier, and to only then heat the already coated carrier to 100° to 300° C. The layer, after the coating with the rubidium bromide, is then heated for a few hours to 200° to 400° C in an atmosphere which contains bromine. The quantity of bromine is not critical inasmuch as the atmosphere serves to prevent a "separation" meaning, a disruptive loss of bromine.

Pursuant to a further process, one begins with carriers which are deformable through the application of pressure. Such carriers generally consist of, such metals as aluminum and the like, or a plastic material, such as polyimide. For this purpose, the fluorescent material is applied onto a sheet made from one of the previously mentioned deformable materials by spraying, painting or pouring of an alcohol-moistened paste of activated rubidium bromide. Also suitable in forming mixtures containing thallium activated rubidium bromide are such solvent mediums as tolune or polysiloxane. After vaporization of the solvent medium, the layer is concentrated through compression at a pressure of from $10^2 kg/cm^2$ to $10^3 kg/cm^2$. Thereafter, the carrier together with the fluorescent material containing layer is brought into the shape required for insertion into an electron-optical arrangement through drawing or stamping. By means of a subsequent tempering at 200° to 300° C, preferably in an atmosphere containing bromine, the mechanical strength and the luminescent properties are improved since there takes place herewith a condensation of the binding and an improved adherence of the fluorescent material to the carrier takes place. The luminescent screens of the invention, such as those which are produced in accordance with one of the previous processes, can then be further processed in the usual manner.

BRIEF DESCRIPTION OF THE DRAWINGS

Reference may now be had to the following detailed description of exemplary embodiments of the invention, taken in conjunction with the accompanying drawings; in which.

DETAILED DESCRIPTION

Figure 1:
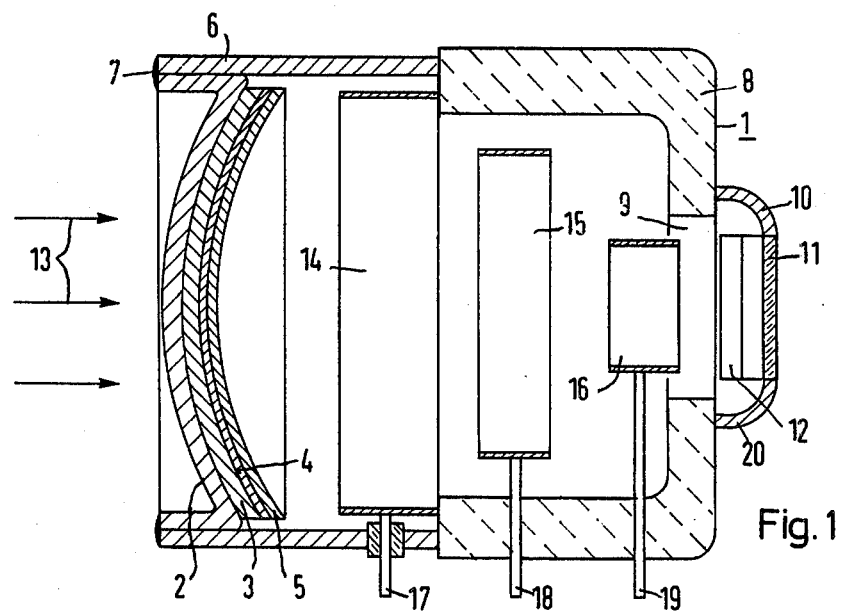
FIG. 1 schematically illustrates a longitudinal section taken through an electronic image intensifier utilizing an X-ray converter screen constructed and operating in accordance with the principles of the invention.

Illustrated in FIG. 1, in conjunction with an electronic X-ray image intensifier 1, is the a converter screen containing a luminescent layer or coating 3 formed in accordance with the principles of the invention. As shown, the luminescent layer 3 is positioned on the inner surface of a radiation transmissive wall 2. On the inner surface of layer 3, the converter screen is provided with an intermediate layer 4, following which there is a photocathode layer 5. This layer combination, i.e., layers 3–5 which is applied to the inlet wall 2 which consists of an aluminum sheet, produces a cover insertable in a sleeve 6. The cover is then welded to the sleeve in a vacuum-tight manner at the rim 7 thereof. In turn, the sleeve is seated on an insulating ceramic member 8 which includes an aperture 9 located opposite the radiation transmissive wall 2, and which is vacuum-tightly closed off via cap 10. The cap itself is provided with a viewing window 11, through which there is observable a luminescent screen 12, which is sensitive to electrons. Electrons, which are released from layers 3–5 by incoming X-rays (schematically indicated by arrows 13), are projected onto screen 12 via electrons 14 through 16 and become visible on screen 12. The imaging is carried out in a known manner in that, across the sleeve 6, there are applied suitable high-voltage potentials to the layer combination 3 through 5, as well as to the terminals 17, 18 and 19, (which are respectively connected to electrodes 14-16), and to the cap 10. These potentials are so selected that the electrodes 14 through 16, as well as the radiation transmissive wall 2 and the cap 10 form an electron optical system in their operative intereffects by means of which electrons which emanate from the photocathode layer 5 are imaged on the screen 6.

Figures 2, 3:
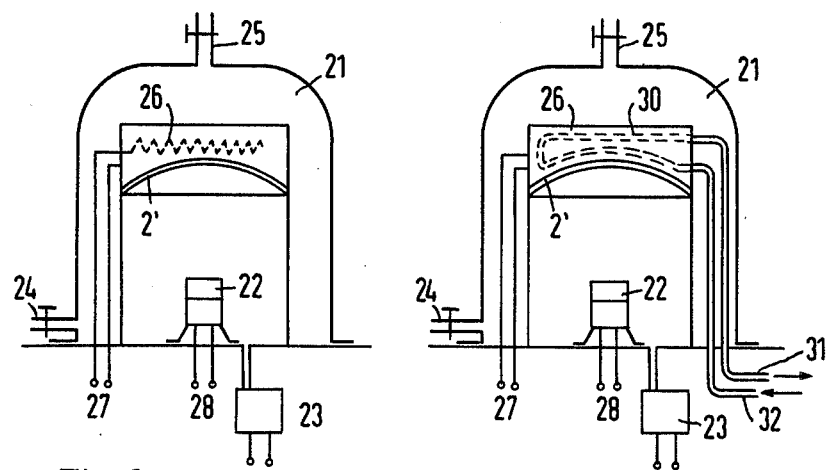
FIG. 2 shows an arrangement for producing the luminescent coating of the screen.
FIG. 3 shows a modified arrangement for producing the luminescent coating of the screen.

FIG. 2 illustrates an apparatus which may be utilized for the production of the fluorescent layer 3 on the inner surface of the spherically curved radiation transmissive wall 2'. This apparatus includes a vacuum chamber 21 and an electrically operated vaporizer 22 positioned within the chamber 21. An amount of rubidium bromide is placed within the vaporizer 22 and the air within chamber 21 is removed via pump 23. The vaporizer 22 is heated sufficient to cause the rubidium bromide therein to vaporize and the rubidium bromide vapors condense as a layer on the inner surface of wall 2'. Gaseous bromine may be introduced into chamber 21 during the deposition process via controlled inlet means 24. As required, the bromine-containing atmosphere within chamber 21 may be vented via a control outlet means 25. In order to activate the rubidium bromide layer sodeposited on wall 2', an amount of thallium bromide is then placed within the vaporizer 22 and upon energization, a vapor-deposited layer of thallium bromide forms on the earlier deposited rubidium bromide layer. Of course, rubidium bromide and thallium bromide may be simultaneously vaporized and co-deposited as a mixed layer on wall 2'. After the deposition process is completed, the deposited layer is annealed by energizing a heating element 26 positioned in working relation above the wall 2' so as to heat the coated wall 2' to an elevated temperature for a duration of about 0.5 to 5 hours and thereby complete the activation process. The operation of the heating element 26, as well as that of the vaporizer 22 and the pump 23 is effected through power supply terminals 27, 28 and 29.

In a modification of the arrangement of FIG. 2, and pursuant to FIG. 3, a cooling conduit 30 may concurrently be provided in the heating element 26. The cooling conduit 30 is provided with a cooling medium flowing in a hydraulic circuit through conduits 31 and 32. By means of this arrangement, the second hereinabove-mentioned method can be carried out, in which first the two-to three-times excess quantity of thallium bromide (TlBr) required for activation, is coated on wall 2', which is positioned within the vacuum chamber 21. Substantially simultaneously, the carrier surface or wall 2' is suitably cooled so as to act in opposition to the high vapor pressure of the TlBr. Thereafter, a quarter of the rubidium bromide is coated on in the manner described in conjunction with the arrangement of FIG. 2 and, finally, after switching off the cooling and switching on of the heating element 26 through the terminals 27, the remainder of the rubidium bromide is coated on the screen which has been heated to between 100° to 300° C. The final activation may then be carried out by providing at least a 10% bromine-containing atmosphere into the chamber 21 through the inlet and outlet means 24 and 25 and heating the coated wall member for 0.5 to 5 hours at a temperature in the range of 300° to 500° C.

Figure 4:
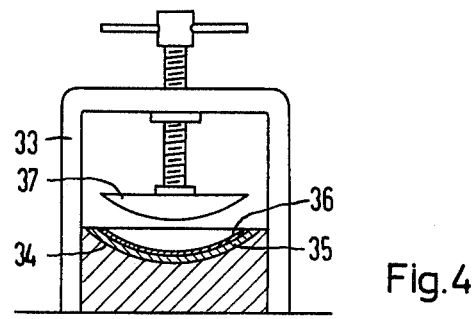
FIG. 4 illustrates an arrangement for shaping a luminescent coating of the invention in accordance with the shape of a converter screen.

Illustrated in FIG. 4 is a press 33 which includes a stamping mold 34 in which there is positioned a spherically curved wall member 35 having a fluorescent layer 36. This layer 36 thereon, together with the curved wall member 35, is brought into the illustrated spherically-shaped form by means of the stamping punch 37 through compression at $10^2$ to $10^3$ kg/cm$^2$. Previously the wall member 35 was provided with the layer 36 by painting on a paste containing the fluorescent material RbBr:Tl, and them drying the resulant coating. As previously mentioned, the mechanical strength and the fluorescent property can be improved through subsequent tempering at 200° to 300° C, preferably in a bromine containing atmosphere.

While there has been shown what is considered to be the preferred embodiment of the invention, it will be obvious that modifications may be made which come within the scope of the disclosure of the specification.

What is claimed is:

1. A radiation converter screen for X-rays having an energy level of 10 to 30 keV comprising:
   a carrier member substantially transmissive to said X-rays and a fluorescent layer on a surface of said carrier member, said fluorescent layer consisting essentially of activated rubidium bromide.

2. A radiation converter screen as defined in claim 1 wherein said activated rubidium bromide has the formula:

$$RbBr:Tl_yBr$$

wherein $y$ is a numeral ranging from 0.1 to 2.

3. An X-ray converter screen comprised of a carrier member substantially transmissive to X-ray radiation and a fluorescent layer on a surface of said carrier member, said fluorescent layer consisting essentially of activated rubidium bromide.

4. An X-ray converter screen as defined in claim 3 wherein said activated rubidium bromide is activated with a thallium halogenide, said thallium halogenide comprising about 0.1 to 2% by weight of said activated rubidium bromide.

5. An X-ray converter screen as defined in claim 4 wherein said halogenide is selected from the group consisting of bromine, chlorine and iodine.

6. An X-ray image intensifier including a converter screen as defined in claim 3.